(12) United States Patent
Vetter et al.

(10) Patent No.: US 10,737,305 B2
(45) Date of Patent: Aug. 11, 2020

(54) PROCESS FOR REMOVING FOULANTS FROM REACTOR INTERNAL SPACES

(71) Applicant: UOP LLC, Des Plaines, IL (US)

(72) Inventors: Michael Jerome Vetter, Schaumburg, IL (US); Bryan James Egolf, Crystal Lake, IL (US); Louis A. Lattanzio, Mount Prospect, IL (US); Clayton Colin Sadler, Arlington Heights, IL (US); Mohamed Sami Elganiny, Dubai (EG)

(73) Assignee: UOP LLC, Des Plaines, IL (US)

( * ) Notice: Subject to any disclaimer, the term of this patent is extended or adjusted under 35 U.S.C. 154(b) by 44 days.

(21) Appl. No.: 15/922,259

(22) Filed: Mar. 15, 2018

(65) Prior Publication Data

US 2019/0283094 A1 Sep. 19, 2019

(51) Int. Cl.
| | | |
|---|---|---|
| *B08B 9/08* | (2006.01) | |
| *B08B 7/00* | (2006.01) | |
| *B08B 5/02* | (2006.01) | |
| *B01J 10/00* | (2006.01) | |
| *B25J 13/00* | (2006.01) | |
| *G05D 1/02* | (2020.01) | |
| *B25J 19/02* | (2006.01) | |
| *B25J 9/16* | (2006.01) | |
| *G05D 1/00* | (2006.01) | |
| *B25J 11/00* | (2006.01) | |
| *B01J 8/02* | (2006.01) | |

(52) U.S. Cl.
CPC .......... *B08B 9/0852* (2013.01); *B01J 8/0214* (2013.01); *B01J 10/007* (2013.01); *B08B 5/02* (2013.01); *B08B 7/0021* (2013.01); *B08B 7/0035* (2013.01); *B25J 9/1664* (2013.01); *B25J 11/0085* (2013.01); *B25J 13/006* (2013.01); *B25J 19/023* (2013.01); *G05D 1/0011* (2013.01); *G05D 1/0212* (2013.01); *Y10S 901/01* (2013.01)

(58) Field of Classification Search
CPC ....... B08B 9/08; B08B 9/0804; B08B 9/0813; B08B 9/087; B08B 9/093; B07B 1/50; B07B 1/54; B01J 8/0025; B01J 8/008
See application file for complete search history.

(56) References Cited

U.S. PATENT DOCUMENTS

| | | | |
|---|---|---|---|
| 4,682,397 A * | 7/1987 | Harth, III | ................. A46D 1/00 29/81.05 |
| 7,434,601 B2 | 10/2008 | Kraus et al. | |
| 9,433,909 B2 | 9/2016 | Vetter et al. | |
| 2008/0145288 A1* | 6/2008 | Koves | ................ B01D 46/0024 422/310 |
| 2008/0148876 A1 | 6/2008 | Hock et al. | |

(Continued)

*Primary Examiner* — Mikhail Kornakov
*Assistant Examiner* — Natasha N Campbell

(57) ABSTRACT

A process for cleaning a reactor, the reactor comprising a shell including catalyst for selectively converting hydrocarbons. The process includes removing catalyst from the reactor and deploying a robot into the reactor. A cleaner from the robot is applied onto a surface within the shell of the reactor that includes a foulant. The cleaner is adapted to remove the foulant from the surface within the shell of the reactor. The cleaner may be one of light radiation, heat radiation, ultra-high pressure fluid, and liquid nitrogen.

19 Claims, 4 Drawing Sheets

(56) References Cited

U.S. PATENT DOCUMENTS

| | | | | |
|---|---|---|---|---|
| 2009/0060780 A1* | 3/2009 | Walter | ................. | B08B 7/0035 |
| | | | | 422/20 |
| 2011/0315164 A1 | 12/2011 | DesOrmeaux | | |
| 2013/0151061 A1* | 6/2013 | Hong | ........................ | B08B 9/08 |
| | | | | 701/25 |
| 2013/0269730 A1* | 10/2013 | McGregor | ............... | B01J 4/002 |
| | | | | 134/22.1 |
| 2016/0346815 A1* | 12/2016 | Johns | ........................ | B08B 9/08 |

* cited by examiner

PROCESS FOR REMOVING FOULANTS FROM REACTOR INTERNAL SPACES

FIELD OF THE INVENTION

This invention relates generally to processes for removing foulants from the internal spaces of a reactor, and more specifically, to processes with a robot cleaning, in situ, the internal surfaces of a reactor.

BACKGROUND OF THE INVENTION

A wide variety of processes use radial flow reactors to provide for contact between a fluid and a solid. The solid usually comprises a catalytic material on which the fluid reacts to form a product. The processes cover a range of processes, including hydrocarbon conversion, gas treatment, and adsorption for separation.

Radial flow reactors are constructed such that the reactor has an annular structure and that there are annular distribution and collection devices. The devices for distribution and collection typically incorporate some type of screened or porous surface. The screened surface is for holding catalyst beds in place and for aiding in the distribution of pressure over the surface of the reactor to facilitate radial flow through the reactor bed. The screen is a mesh, either wire or other material, or a punched plate. For either a fixed bed or moving bed, the screen or mesh provides a barrier to prevent the loss of solid catalyst particles while allowing fluid to flow through the bed. In a moving bed, solid catalyst particles are added at the top and flow through the apparatus and are removed at the bottom, while passing through a screened-in enclosure that permits the flow of fluid over the catalyst. In a fixed bed, the catalyst, or adsorbent, is loaded into a bed between screens, or other retention devices, and the screens allow fluid to flow over the catalyst while holding the catalyst in place. The screen is preferably constructed of a non-reactive material, but in reality, the screen often undergoes some reaction through corrosion and/or erosion, and over time problems arise from the corroded or eroded screen or mesh. For example, as a result of use, the screen includes carbon deposits and scale that clog the pores of the screen and reduce the performance of the reactor.

In order to remove deposits and other material on the screens, conventional cleaning processes remove the screens from the reactor and remove the foulants from the screens. Specifically, when it is necessary to clean the reactor screens, the reactor is shut down and the catalyst is removed from the reactor. After removing the catalyst from the reactor, the screens are dissembled and removed from the reactor. Then, once removed, the screens are cleaned to remove any foulants. Once they have been cleaned, the screens are reassembled inside of the reactor. Accordingly, as will be appreciated, such cleaning methods are both time consuming and costly.

Therefore, there is a need for effective and efficient processes for cleaning the surfaces of the retaining screens that reduce the amount of time required to clean the surfaces of the retaining screens. Furthermore, it would be desirable to have one or more cleaning processes in which the screens remain in the reactor for the entire cleaning process.

SUMMARY OF THE INVENTION

One or more processes have been invented which reduce the time required for cleaning the surfaces of screens within radial flow reactors by utilizing a robot within the reactor to remove the foulants. By utilizing a robot to clean the surfaces while the screens are still inside of the reactor, the complete disassembly and reassembly of the reactor screens is not required. Rather, the robot is inserted into the reactor and applies a cleaner to the surfaces of the screen. It is also contemplated that the robot is equipped with an image capture device, like a video camera or still camera, to also allow for the visual inspection of the internals from a position outside of the reactors. By not requiring the screens be disassembled and reassembled, these processes reduce the amount of time required for cleaning the reactor internal surfaces and thus reduce the down time associated with cleaning such a reactor.

In at least one aspect, therefore, the present invention may be characterized as providing a process for cleaning a reactor. The reactor includes a shell typically containing one or more catalysts for selectively converting hydrocarbons. The cleaning processes includes: removing the catalyst from the reactor; deploying a robot into the reactor; and, applying a cleaner from the robot onto a surface within the shell of the reactor, wherein the surface within the shell of the reactor includes a foulant, and wherein the cleaner is adapted to remove the foulant from the surface within the shell of the reactor, wherein the cleaner is selected from a group consisting of: light radiation, heat radiation, ultra-high pressure liquid, and liquid nitrogen.

The present invention may also be characterized, in one or more aspects, as providing a process for cleaning a reactor by: removing an access panel from a port of a reactor, the reactor configured to be operated under conditions for the selective conversion of hydrocarbons, and wherein the reactor comprises a shell and one or more screens disposed within the shell forming an annular space between the one or more screens and the shell, and wherein the annular space includes a catalyst, which has been removed; deploying a robot into the annular space of the reactor through the port of the reactor; and, applying a cleaner from the robot onto a surface in the annular space that includes a foulant, wherein the cleaner is adapted to remove the foulant from the surface in the annular space, and wherein the one or more screens are within the shell while the cleaner is applied.

In another aspect, the present invention, generally, be characterized as providing a process for cleaning a reactor used to selectively convert hydrocarbons that has become fouled by: selectively converting hydrocarbons from a feed stream within a reactor, the reactor including a catalyst configured to selectively convert the hydrocarbons from the feed stream, and wherein the selective conversion creates one or more foulants on a surface inside of the reactor; stopping a flow of the feed stream to the reactor; removing the catalyst from the reactor; deploying a robot into the reactor; supplying a purge gas into the reactor; and, applying a cleaner from the robot onto the surface inside of the reactor, wherein the cleaner is adapted to remove the foulant from the surface within the reactor.

Additional aspects, embodiments, and details of the invention, all of which may be combinable in any manner, are set forth in the following detailed description of the invention.

DETAILED DESCRIPTION OF THE DRAWINGS

One or more exemplary embodiments of the present invention will be described below in conjunction with the following drawing figures, in which.

DETAILED DESCRIPTION OF THE INVENTION

Figure 1:
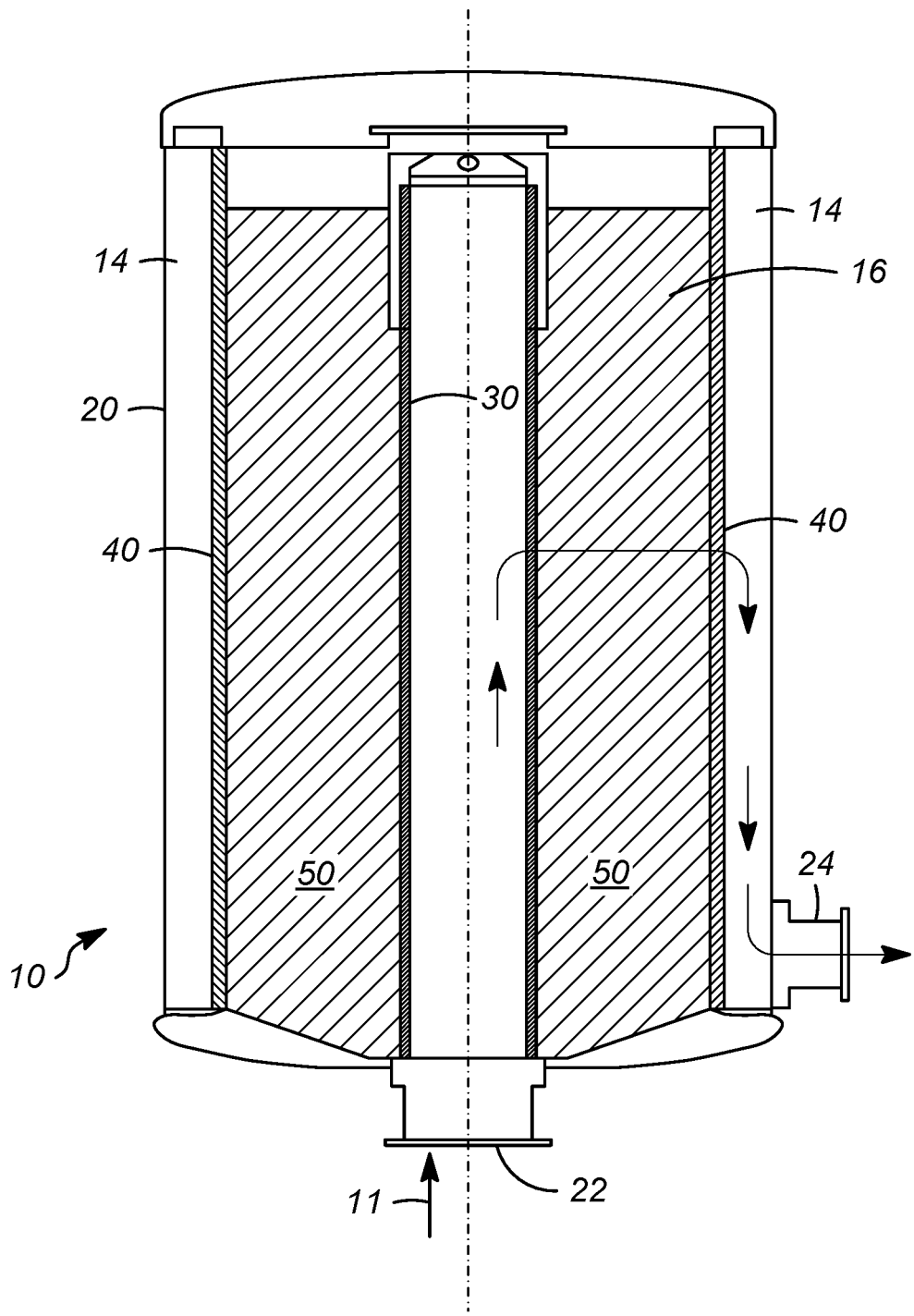
FIG. 1 depicts a side cutaway view of a radial flow reactor used in accordance with various aspects of the present invention.

One or more embodiments of the present invention will now be described with the understanding that the following description is not intended to be limiting.

With reference to FIGS. 1 to 4, the present invention relates to processes for cleaning a radial flow reactor 10 that includes outer and inner annular partitions (or spaces) 14, 16 for supporting an annular bed of solid catalyst material therebetween that is used for selectively converting hydrocarbons. The reactor 10 includes a reactor shell 20, a centerpipe 30, a screened partition 40, and a solid particle catalyst 50.

The reactor 10 of FIG. 1 is configured so that fluid enters the reactor 10 through an inlet 22 at the bottom of the reactor shell 20 and travels upwardly through the centerpipe 30 in the direction indicated by arrow 11. As the fluid flows upwardly, portions of the fluid are directed radially through the centerpipe 30, into the catalyst 50 where the fluid contacts the catalyst and reacts to form a product stream. The product stream flows radially outwardly through the screened partition 40 and into the outer annular space 14 between the screened partition 40 and the reactor shell 20. The product stream is collected in the outer annular space 14 and passes out of the reactor shell 20 through a reactor outlet 24.

Figure 2:
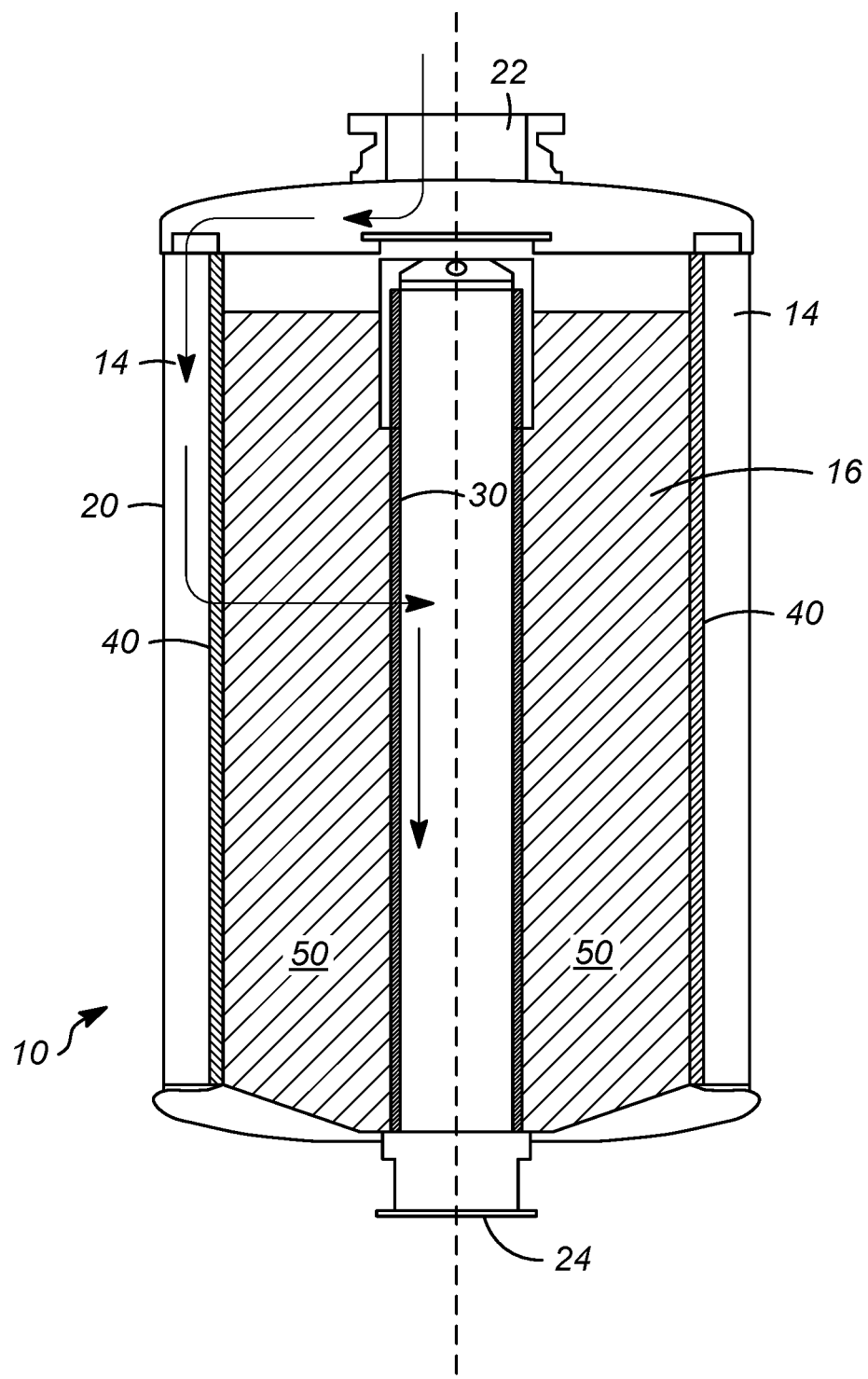
FIG. 2 depicts a side cutaway view of another radial flow reactor used in accordance with various aspects of the present invention.

The reactor 10 illustrated in FIG. 2 is configured to have an opposite flow pattern such that fluid enters through the inlet 22 at the top of the reactor shell 20 and enters the outer annular space 14 between the reactor shell 20 and the screened partition 40. From the outer annular space 14, the fluid flows radially inwardly through the catalyst 50 where it contacts the catalyst and reacts to form a product stream. The product stream flows radially inwardly through the center pipe 30 where it is collected in the centerpipe 30 and exits the reactor shell 20 through the outlet 24.

Figure 3:
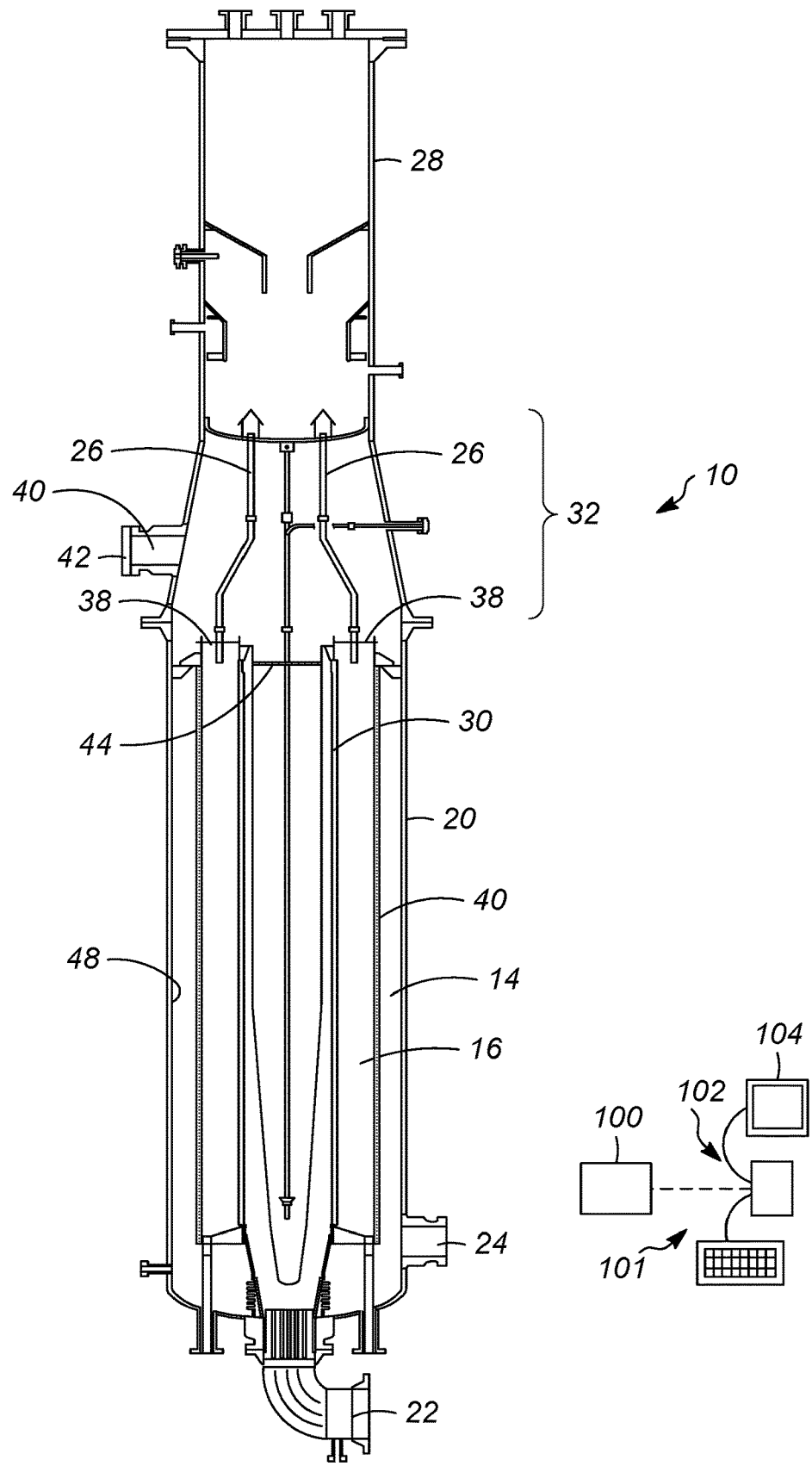
FIG. 3 depicts a side cutaway view of yet another radial flow reactor used in accordance with various aspects of the present invention; and, FIG. 4 depicts a side cutaway view of the radial flow reactor of FIG. 1 with the catalyst removed and a robot applying a cleaner to the internal surfaces thereof.
Figure 4:
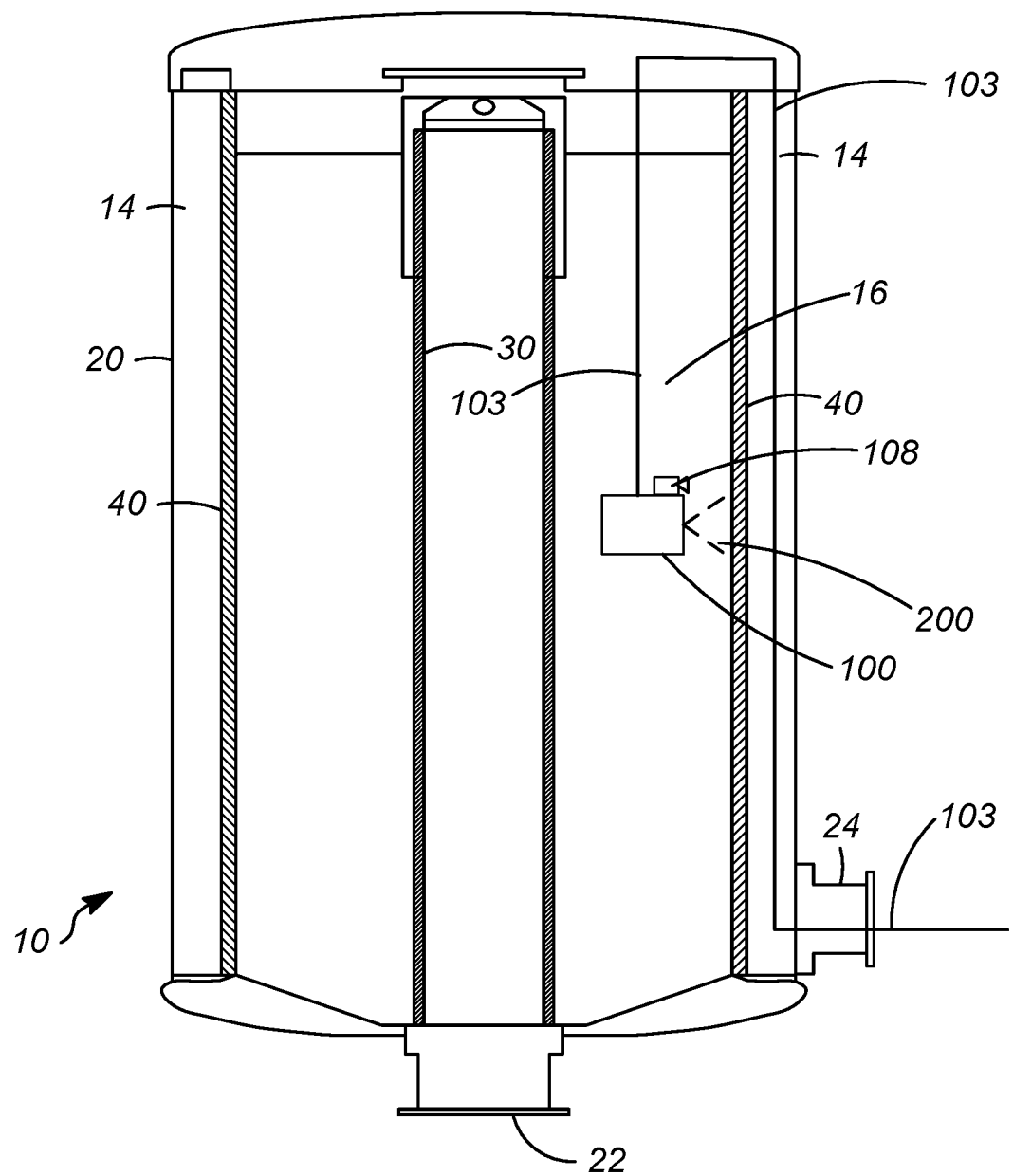

The reactor 10 illustrated in FIG. 3 includes catalyst transfer tubes 26 which transfer catalyst from a second reactor 28 disposed on top of the first reactor 10. The catalyst transfer tubes 26 pass from the second reactor 28, through an upper portion 32 of the first reactor 10, and provide catalyst to the inner annular zone 16. The fluid is once again introduced into the reactor shell 20 via the inlet 22 where it flows radially outward from the centerpipe 30 and the product stream is recovered from the reactor shell 20 via the outlet 24. Other configurations of the radial flow reactor 10 and flow are also possible and contemplated herein and the remaining details of the depicted radial flow reactor 10 are shown in U.S. Pat. Pub. No. 2013/0343961, the entirety of which is incorporated herein by reference.

Where the reactor includes a radial outward flow configuration like that shown in FIGS. 1 and 3, the centerpipe 30 includes an outer catalyst-side profile wire screen and an inner fluid-side perforated plate. The outer partition may also include an inner catalyst-side profile wire screen and/or an outer fluid-side perforated plate. Alternatively, where the reactor includes the radially inward flow configuration of FIG. 2, the screened partition 40 includes an inner catalyst-side profile wire screen and an outer fluid-side perforated plate. The centerpipe 30 may also include an outer catalyst-side profile wire screen and/or inner fluid-side perforated plate.

In either configuration of a radial flow reactor, the internal screens of the centerpipe 30 and the screened partition 40 are subjected to many stresses and a corrosive environment as a result of the chemical reactions occurring therein. Specifically, the reactors 10 typically are operated under conditions such that the catalyst 50 selectively converts hydrocarbons in the feed stream into other chemical products (either desired end products or intermediate products).

Overtime the screens of the centerpipe 30 and the screened partition 40 become clogged from foulants, such as coke and scale, as a result of the chemical reactions occurring the reactor 10. In conventional processes for cleaning the reactors 10, the reactor 10 is shut down and the catalyst removed. Once the catalyst is removed, the internal components of the reactors, including the porous screens forming the centerpipe 30 and the screened partition 40, are disassembled and removed from the reactor shell 20. Once removed from the reactor shell 20, the foulants are removed from the porous screens of the centerpipe 30 and the screened partition 40 with a cleaner. After being cleaned, the centerpipe 30 and the screened partition 40 are reassembled within the reactor shell 20. This entire process is time consuming and, since the reactor is shutdown, costly for the operator since the reactor is not in use. The processes of the present invention reduced the time required for cleaning these screen portions of the reactor by providing maintaining the porous screens within the reactor 10 and cleaning the porous screens within the reactor shell 20.

Accordingly, in the various processes of the present invention, the processes begin with stopping the flow of any feed stream and other reactants to the reactor 10 and removing the catalyst 50 from the inner annular space 16. For example, the catalyst is removed via catalyst transfer tubes 26, as shown in FIG. 3. In the reactor shown in FIG. 3, the inner annular space 16 is capped by a cover deck 38. In at least some embodiments, the catalyst transfer tubes 26 and the cover deck 38 are removed prior to cleaning so as to allow for access to the inner annular space 16. The cover deck 38 and catalyst transfer tubes 26 are accessed through a manway 41, or port, in the reactor shell 20 that is typically covered with a cover 42, or access panel. Additionally, an upper screen 44 on top of the centerpipe 30 is either removed or maintained during the cleaning processes.

Once the catalyst has been removed, a robot 100 is deployed into the reactor 10. The robot 100 is remotely operated with a remote control at a control station, or it follows a set of instructions for cleaning.

Those of skill in the art will appreciate that the illustrative logical instruction, steps, blocks, modules, and circuits described in the present application may be implemented as electronic hardware, computer software, or combinations of both. Some of the embodiments and implementations are described herein based upon functional and/or logical block components (or modules) and various steps. However, those of ordinary skill in the art will appreciate that these steps and block components (or modules) may be realized by any number of hardware, software, and/or firmware components configured to perform the specified functions Thus, based upon the interchangeability of hardware and software, the various steps, components, blocks, modules, and circuits are described herein generally in terms of their functionality. Whether such functionality is implemented as hardware or software depends upon the any design constraints imposed on the overall system and can vary for each different application of the present invention. A person of ordinary skill in the art may implement this functionality in diverse ways for each particular application, but such implementation decisions should not be interpreted as causing a departure from the scope of the present invention.

The various processes described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, the processor may be any conventional processor, controller, microcontroller, or state machine. A processor may also be a combination of computing devices, e.g., a combination of a DSP and a microprocessor, two or more microprocessors, or any other combination of the foregoing.

The steps of the processes described herein may be embodied in an algorithm contained directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is in communication with the processor such the processor reads information from, and writes information to, the storage medium. This includes the storage medium being integral to or with the processor. The processor and the storage medium may reside in an ASIC. The ASIC may reside in a user terminal. Alternatively, the processor and the storage medium may reside as discrete components in a user terminal. These devices are merely intended to be exemplary, non-limiting examples of a computer readable storage medium. The processor and storage medium or memory are also typically in communication with hardware (e.g., ports, interfaces, antennas, amplifiers, signal processors, etc.) that allow for wired or wireless communication between different components, computers processors, or the like.

The robot 100 may include software stored in a non-transitory medium, hardware, firmware, etc., containing executable instructions for causing the robot 100 to perform one or more steps of the exemplary methods. Example software includes an operating system running one or more applications (apps) that perform one or more steps of example methods. Existing operating systems or apps may be configured to cause the portable electronic devices to perform steps of example methods. Alternatively, the robot 100 is in communication with another device, (i.e., another computer) which includes such software for causing the robot 100 to perform one or more steps of the exemplary methods. In communication refers to the ability to transmit and receive information or data. The transmission of the data or information is a wireless transmission (for example by WiFi or Bluetooth) or a wired transmission (for example using an Ethernet RJ45 cable or an USB cable associated with tether 103 in FIG. 4). For a wireless transmission, a wireless transceiver (for example a WiFi transceiver) is in communication with each processor or computer. The transmission is performed automatically, at the request of the computers, in response to a request from a computer, or in other ways. Data is pushed, pulled, fetched, etc., in any combination, to the robot 100, or transmitted and received in any other manner.

In some embodiments, the robot 100 utilizes wheels to move within the reactor shell 20. It is contemplated that the wheels engage tracks that are temporarily installed on surfaces within the reactor shell 20, for example, on an inner surface 48 of the shell, on the porous screens of the centerpipe 30 and the screened partition 40, or on the centerpipe 30. Alternatively, in some embodiments, the robot 100 is a drone, or flying robot 100 configured to move within the reactor 10, specifically, within the annular spaces 14, 16 inside of the reactor shell 20. For the purposes of the present application, the exact style and design of the robot 100 are not intended to be limiting provided that the robot 100 is able to fit within the annular spaces 14, 16 inside of the reactor shell 14 (and/or fir within the centerpipe 30), move therein, and apply a cleaner 200 (see FIG. 4) to one or more internal surfaces of the reactor 10.

The cleaner 200 applied by the robot 100 is adapted and configured to remove the foulant from the one or more internal surfaces of the reactor 10. There are many different processes by which the cleaner 200 removes the foulant from the surface. For example, it is contemplated that the cleaner 200 freezes the foulant and the frozen material falls off from the surface as a result of pressure applied thereto. It is also contemplated that the cleaner 200 is a pressurized fluid that removes the foulant as a result of the pressure of the fluid being applied to the surface. Thus, the cleaner 200 may be a pressurized fluid, like water or an aqueous solution. It is contemplated that if the cleaner 200 is a pressurized fluid, it is an ultra-high pressure fluid. By "ultra-high pressure fluid" it is meant to mean a liquid cleaner that is applied at a psi of at least 20,000 psi (137.9 MPa), and preferably between 20,000 to 60,000 psi (137.9-413.7 MPa), or between 20,000 to 40,000 psi (137.9-257.8 MPa). The "ultra-high pressure fluid" as a cleaner 200 is particularly advantageous compared to lower pressure fluids in cleaning processes associated reactors 10 that are relatively tall. Furthermore, the "ultra-high pressure fluid" as a cleaner 200 is believed to require less fluid compared to lower pressure fluids. This is beneficial as it is believed to be desirable to use a little fluid for cleaning as possible. Thus, the benefit of the higher pressure is a higher energy/greater force for the delivered cleaner enabling higher erosive/abrasive and flushing effect for removing and transporting foulants, which increases cleaning effectiveness and reduces cleaning time.

Additionally, or alternatively, the pressurized fluid dissolves the foulant. It is contemplated that the pressurized fluid includes media, like solids/particulates, to facilitate in the removal of the foulant. According to various contemplated processes, the cleaner 200 heats and/or combusts the foulant in order to remove it from the inner surface(s) of the reactor.

Exemplary cleaners 200 include liquid nitrogen, pressurized solvents, and radiation, including heat radiation from, for example an induction heater, and light radiation from, for example, a UV radiation emitter or a LASER. The cleaner 200 is provided to the robot 100, for example, via a tether or conduit 103, or it is stored in a storage tank on the robot 100 or generated on the robot 100. Unlike processes in which a tool or implement is used to physically remove materials by scraping the foulant, these cleaners 200 are believed to be less likely to damage the surfaces being cleaned.

Within the reactor, it is particularly desirable that the robot 100 is capable of applying the cleaner 200 to the porous screens forming the annular portions 14, 16 within the reactor 10. Since these surfaces are located throughout the reactor internals, the cleaning processes of the present invention contemplate that the robot 100 applies the cleaner 200 at a first location, deemed the first cleaning location, and then moves to a second location, deemed the second cleaning location, where the robot 100 again applies the cleaner 200.

As mentioned above, the movement of the robot 100 is controlled by instructions that come from either a remotely operated controller (such as a joystick, buttons, touch pad control, an application on a portable electronic device or any other device capable of receiving user inputted control signals) at the control station, or from a predetermined cleaning procedure. The predetermined cleaning procedure is local, i.e., stored on the robot 100, or it is sent from a remote computer 102 at the control station in communication with the robot 100. Thus, in at least one embodiment, the robot 100 is preprogrammed to follow a specific path within the reactor 10.

In addition to applying the cleaner 200 to remove foulants, it is further contemplated that the robot 100 performs other functions while moving about within the reactor 10. For example, it is contemplated that the robot 100 includes a camera 108 configured to take images (including video) of the various spaces, surfaces, and components within the reactor 10. These images are transmitted back to the computer 102, via the robot 100 or the camera directly, to be displayed on a display screen 104 associated with the remote computer 102. The display screen 104 may include a portable display screen like a tablet, phone or other handheld device. This will allow for visual inspection of the internal spaces, surfaces, and components of the reactor 10 while the robot 100 is moving about the reactor 10. The display screen 104 also may display data or information about the robot 100, such as position, time spent cleaning, status of battery or other fuel level, etc.

In order to provide data associated the positioning of the robot 100 within the reactor 10, it is contemplated that the robot 100 includes position sensors that provide data relative to the position, speed, and orientation of the robot 100 within the reactor 10. The robot 100 transmits the data to the remote computer 102 receives the data. The data is used to determine a position of the robot 100 within the reactor 10, for example, when determining the position of an image captured by the robot 100.

It is further completed that robot 100 is configured to inject a dye into the reactor 10 to evaluate metallurgy and welded connections for any cracking and fissuring. Once the dye is injected, the camera or other data sensors on the robot 100 provide for an initial inspection of the joints.

In order to remove various combustion products, foulants, or other materials from the reactor internal space, it is contemplated that the robot 100 includes at least one conduit (such as conduit 103 in FIG. 4) in communication with a source of negative pressure or suction. It is also contemplated that gases are supplied into the reactor 10 during the cleaning processes to provide a desired atmosphere. For example, gaseous nitrogen may be supplied to provide the reactor with an inert atmosphere. Similarly, dry or diluted air (or oxygen) may be provided to provide a source of oxygen for combustion. These gases are also provided with conduits (such as conduit 103 in FIG. 4) which are provided on the robot 100 or they are separately inserted into the reactor 10. It should be appreciated that any gas supplied may be utilized for its reactiveness (or non-reactiveness) based on the cleaner 200 being applied.

According to the various processes, once the robot 100 has removed the foulants, it is removed from the reactor 10. Those components of the reactor 10 that were disassembled for the cleaning procedure are reassembled. Compared with conventional processes, the time required for cleaning the reactor is shorter. Thus, while there is some disassembly and reassembly required, the present processes reduce the required time, allowing the reactor to be cleaned and returned to service in significantly less time.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understanding the embodiments of the present invention.

Specific Embodiments

While the following is described in conjunction with specific embodiments, it will be understood that this description is intended to illustrate and not limit the scope of the preceding description and the appended claims.

A first embodiment of the invention is a process for cleaning a reactor, the reactor comprising a shell including a catalyst for selectively converting hydrocarbons and the process comprising removing the catalyst from the reactor; deploying a robot into the reactor; and, applying a cleaner from the robot onto a surface within the shell of the reactor, wherein the surface within the shell of the reactor includes a foulant, and wherein the cleaner is adapted to remove the foulant from the surface within the shell of the reactor, wherein the cleaner is selected from a group consisting of light radiation, heat radiation, ultra-high pressure fluid, and liquid nitrogen. An embodiment of the invention is one, any or all of prior embodiments in this paragraph up through the first embodiment in this paragraph wherein the catalyst is maintained inside of the reactor by one or more screens having a porous surface. An embodiment of the invention is one, any or all of prior embodiments in this paragraph up through the first embodiment in this paragraph wherein the porous surface of the one or more screens comprises the surface within the shell of the reactor that includes the foulant. An embodiment of the invention is one, any or all of prior embodiments in this paragraph up through the first embodiment in this paragraph wherein the surface within the shell of the reactor that includes the foulant further comprises an inner surface of the shell of the reactor. An embodiment of the invention is one, any or all of prior embodiments in this paragraph up through the first embodiment in this paragraph wherein the cleaner is applied to the surface within the shell of the reactor at a first cleaning location, and wherein the process further comprises moving the robot from the first cleaning location to a second cleaning location within the reactor; and applying the cleaner from the robot onto a second surface within the reactor at the second cleaning location. An embodiment of the invention is one, any or all of prior embodiments in this paragraph up through the first embodiment in this paragraph wherein the robot receives instructions to control a movement of the robot from the first cleaning location to the second cleaning location. An embodiment of the invention is one, any or all of prior embodiments in this paragraph up through the first embodiment in this paragraph wherein the instructions are from a predetermined cleaning procedure.

An embodiment of the invention is one, any or all of prior embodiments in this paragraph up through the first embodiment in this paragraph wherein the instructions are from a remotely operated controller used to control the movement of the robot. An embodiment of the invention is one, any or all of prior embodiments in this paragraph up through the first embodiment in this paragraph wherein the robot is deployed into the reactor by removing an access panel which does not allow for direct access to the catalyst.

A second embodiment of the invention is a process for cleaning a reactor, the process comprising removing an access panel from a port of a reactor, the reactor configured to be operated under conditions for the selective conversion of hydrocarbons, wherein the reactor comprises a shell and one or more screens disposed within the shell forming an annular space between the one or more screens and the shell, and wherein the annular space include a catalyst which has been removed; deploying a robot into the annular space of the reactor through the port of the reactor; and, applying a cleaner from the robot onto a surface in the annular space that includes a foulant, wherein the cleaner is adapted to remove the foulant from the surface in the annular space, and wherein the one or more screens of catalyst are within the shell while the cleaner is applied. An embodiment of the invention is one, any or all of prior embodiments in this paragraph up through the second embodiment in this paragraph wherein the cleaner is selected from a group consisting of light radiation, heat radiation, ultra-high pressure fluid, and pressurized fluid. An embodiment of the invention is one, any or all of prior embodiments in this paragraph up through the second embodiment in this paragraph further comprising removing the foulant from the annular space with the robot after the foulant has been removed from the surface in the annular space. An embodiment of the invention is one, any or all of prior embodiments in this paragraph up through the second embodiment in this paragraph further comprising moving the robot within the annular space. An embodiment of the invention is one, any or all of prior embodiments in this paragraph up through the second embodiment in this paragraph, wherein the robot moves according to a predetermined path. An embodiment of the invention is one, any or all of prior embodiments in this paragraph up through the second embodiment in this paragraph, wherein the robot moves in response to a remotely operated controller. An embodiment of the invention is one, any or all of prior embodiments in this paragraph up through the second embodiment in this paragraph further comprising displaying one or more images of the annular space, wherein the robot includes at least one camera configured to obtain the one or more images of the annular space. An embodiment of the invention is one, any or all of prior embodiments in this paragraph up through the second embodiment in this paragraph wherein the robot comprises one or more positioning sensors, and wherein the process includes determining a position of the robot within the annular space based upon data received from the one or more positioning sensors. An embodiment of the invention is one, any or all of prior embodiments in this paragraph up through the second embodiment in this paragraph further comprising injecting a dye into the one or more welded connections in order to evaluate a condition of the reactor. An embodiment of the invention is one, any or all of prior embodiments in this paragraph up through the second embodiment in this paragraph, wherein the robot includes at least one conduit connected with a source of a gas, and the process further comprising supplying the gas into the annular space with the robot.

A third embodiment of the invention is a process for cleaning a reactor used to selectively convert hydrocarbons that has become fouled, the process comprising selectively converting hydrocarbons from a feed stream within a reactor, the reactor including catalyst configured to selectively convert the hydrocarbons from the feed stream, and wherein the selective conversion creates one or more foulants on a surface inside of the reactor; stopping a flow of the feed stream to the reactor; removing the catalyst from the reactor; deploying a robot into the reactor; supplying a purge gas into the reactor; and, applying a cleaner from the robot onto the surface inside of the reactor, wherein the cleaner is adapted to remove the foulant from the surface within the reactor.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for cleaning a reactor, the reactor comprising a shell and one or more screens disposed within the shell forming an annular space between the one or more screens and the shell for selectively converting hydrocarbons and the process comprising:
   removing a catalyst from the reactor, wherein the annular space includes the catalyst, and wherein the one or more screens provide a barrier to solid particles while allowing any fluid to flow through the one or more screens;
   deploying a robot into the reactor; and,
   applying a cleaner from the robot onto a surface within the shell of the reactor, wherein the surface within the shell of the reactor includes a foulant, and wherein the cleaner is adapted to remove the foulant from the surface within the shell of the reactor, wherein the cleaner is selected from a group consisting of light radiation, heat radiation, ultra-high pressure fluid, and liquid nitrogen.

2. The process of claim 1 wherein the catalyst is maintained inside of the reactor by the one or more screens having a porous surface.

3. The process of claim 2 wherein the porous surface of the one or more screens comprises the surface within the shell of the reactor that includes the foulant.

4. The process of claim 3 wherein the surface within the shell of the reactor that includes the foulant further comprises an inner surface of the shell of the reactor.

5. The process of claim 1 wherein the cleaner is applied to the surface within the shell of the reactor at a first cleaning location, and wherein the process further comprises:
moving the robot from the first cleaning location to a second cleaning location within the reactor; and
applying the cleaner from the robot onto a second surface within the reactor at the second cleaning location.

6. The process of claim 5 wherein the robot receives instructions to control a movement of the robot from the first cleaning location to the second cleaning location.

7. The process of claim 6 wherein the instructions are from a predetermined cleaning procedure.

8. The process of claim 6 wherein the instructions are from a remotely operated controller used to control the movement of the robot.

9. The process of claim 1 wherein the robot is deployed into the reactor by removing an access panel which does not allow for direct access to the catalyst.

10. A process for cleaning a reactor, the process comprising:
removing an access panel from a port of a reactor, the reactor configured to be operated under conditions for the selective conversion of hydrocarbons, wherein the reactor comprises a shell and one or more screens disposed within the shell forming an annular space between the one or more screens and the shell, and wherein the annular space includes a catalyst which has been removed, and wherein the one or more screens provide a barrier to solid particles while allowing any fluid to flow through the one or more screens;
deploying a robot into the annular space of the reactor through the port of the reactor; and,
applying a cleaner selected from a group consisting of light radiation, heat radiation, ultra-high pressure fluid, and liquid nitrogen from the robot onto a surface in the annular space that includes a foulant, wherein the cleaner is adapted to remove the foulant from the surface in the annular space, and wherein the one or more screens are within the shell while the cleaner is applied.

11. The process of claim 10 further comprising:
removing the foulant from the annular space with the robot after the foulant has been removed from the surface in the annular space.

12. The process of claim 10 further comprising:
moving the robot within the annular space.

13. The process of claim 12, wherein the robot moves according to a predetermined path.

14. The process of claim 12, wherein the robot moves in response to a remotely operated controller.

15. The process of claim 10 further comprising:
displaying one or more images of the annular space, wherein the robot includes at least one camera configured to obtain the one or more images of the annular space.

16. The process of claim 10 wherein the robot comprises one or more positioning sensors, and wherein the process includes:
determining a position of the robot within the annular space based upon data received from the one or more positioning sensors.

17. The process of claim 10 further comprising:
injecting a dye into one or more welded connections in order to evaluate a condition of the reactor.

18. The process of claim 10, wherein the robot includes at least one conduit connected with a source of a gas, and the process further comprising:
supplying the gas into the annular space with the robot.

19. A process for cleaning a reactor used to selectively convert hydrocarbons that has become fouled, the process comprising:
selectively converting hydrocarbons from a feed stream within a reactor comprising a shell and one or more screens disposed within the shell forming an annular space between the one or more screens and the shell, the annular space including a catalyst configured to selectively convert the hydrocarbons from the feed stream, wherein the one or more screens provide a barrier to solid particles while allowing any fluid to flow through the one or more screens, and wherein the selective conversion creates one or more foulants on a surface inside of the reactor;
stopping a flow of the feed stream to the reactor;
removing the catalyst from the reactor;
deploying a robot into the reactor;
supplying a purge gas into the reactor; and,
applying a cleaner selected from a group consisting of light radiation, and heat radiation, from the robot onto the surface inside of the reactor,
wherein the cleaner is adapted to remove the foulant from the surface within the reactor.

* * * * *